(12) United States Patent
Zeng et al.

(10) Patent No.: US 11,516,563 B2
(45) Date of Patent: Nov. 29, 2022

(54) PASSIVE OPTICAL NETWORK (PON) SYNCHRONIZATION AND CLOCK RECOVERY

(71) Applicant: HUAWEI TECHNOLOGIES CO., LTD., Shenzhen (CN)

(72) Inventors: Huaiyu Zeng, Red Bank, NJ (US); Yuanqiu Luo, Cranbury, NJ (US); Andy Shen, Morganville, NJ (US); Xiang Liu, Marlboro, NJ (US); Frank Effenberger, Frisco, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/027,438

(22) Filed: Sep. 21, 2020

(65) Prior Publication Data
US 2021/0006874 A1 Jan. 7, 2021

Related U.S. Application Data

(63) Continuation of application No. PCT/US2020/012239, filed on Jan. 3, 2020.

(60) Provisional application No. 62/788,609, filed on Jan. 4, 2019.

(51) Int. Cl.
H04Q 11/00 (2006.01)
H04J 3/06 (2006.01)

(52) U.S. Cl.
CPC ........ *H04Q 11/0067* (2013.01); *H04J 3/0608* (2013.01)

(58) Field of Classification Search
CPC ........ H04B 10/27; H04J 3/0608; H04J 14/00; H04Q 11/0067
See application file for complete search history.

(56) References Cited

U.S. PATENT DOCUMENTS

2010/0172647 A1* 7/2010 Luo .............. H04J 3/0655 398/66
2011/0142437 A1* 6/2011 Luo .............. H04J 3/0608 398/1
2017/0223438 A1* 8/2017 Detwiler ............ H04Q 11/00
(Continued)

FOREIGN PATENT DOCUMENTS

WO 2018014161 A1 1/2018

OTHER PUBLICATIONS

"Series G: Transmission Systems and Media, Digital Systems and Networks, Digital sections and digital line system—Optical line systems for local and access networks, 10-Gigabit-capable passive optical networks (XG-PON) Transmission convergence (TC) layer specification," ITU-T, G.987.3, Jan. 2014, 146 pages.
(Continued)

*Primary Examiner* — Dzung D Tran
(74) *Attorney, Agent, or Firm* — Conley Rose, P.C.

(57) ABSTRACT

An ONU is provided. The ONU comprises a receiver configured to receive a first PON frame from an OLT, the first PON frame comprising a first PSBd field, the first PSBd field comprising a first PSync field, the first PSync field comprising first bits, and a first quantity of the first bits being greater than 64 bits; and a processor coupled to the receiver and configured to perform synchronization of the first PON frame by matching the first bits to a pre-stored sequence.

20 Claims, 7 Drawing Sheets

(56) References Cited

U.S. PATENT DOCUMENTS

2017/0366254 A1* 12/2017 Gao ................... H04B 10/03
2019/0158220 A1*  5/2019 Gao ................... H04L 1/0075

OTHER PUBLICATIONS

"Gold Code," Wikipedia, Jan. 2, 2019, 2 pages.
"Maximum length sequence," Wikipedia, Jan. 4, 2019, 5 pages.
Dawes, P., "Draft G.989.3—TC Layer for NG-PON2," ITU-T Draft ; Study Period 2013-2016, International Telecommunication Union, Geneva ; CH ; vol. 2/15, Retrieved Nov. 4, 2013, pp. 1-60.

* cited by examiner

PASSIVE OPTICAL NETWORK (PON) SYNCHRONIZATION AND CLOCK RECOVERY

CROSS-REFERENCE TO RELATED APPLICATIONS

This is a continuation of Int'l Patent App. No. PCT/US2020/012239 filed on Jan. 3, 2020, which claims priority to U.S. Prov. Patent App. No. 62/788,609 filed on Jan. 4, 2019, both of which are incorporated by reference.

TECHNICAL FIELD

The disclosed embodiments relate to optical networks in general and PON synchronization and clock recovery in particular.

BACKGROUND

Optical networks are networks that use optical signals to carry data. Light sources such as lasers generate optical signals. Modulators modulate the optical signals with data to generate modulated optical signals. Various components transmit, propagate, amplify, receive, and process the modulated optical signals. Optical networks may implement multiplexing to achieve high bandwidths. Optical networks implement data centers, metropolitan networks, PONs, long-haul transmission systems, and other applications.

SUMMARY

A first aspect relates to an ONU, the ONU comprising: a receiver configured to receive a first PON frame from an OLT, the first PON frame comprising a first PSBd field, the first PSBd field comprising a first PSync field, the first PSync field comprising first bits, and a first quantity of the first bits being greater than 64 bits; and a processor coupled to the receiver and configured to perform synchronization of the first PON frame by matching the first bits to a pre-stored sequence.

In a first implementation form of the ONU according to the first aspect as such, the receiver further configured to receive a second PON frame, the second PON frame comprising a second PSBd field and the second PSBd field comprising a second PSync field, the second PSync field comprising second bits, a second quantity of the second bits being greater than 64 bits, and the processor being further configured to perform synchronization of the second PON frame by matching the second bits to the pre-stored sequence.

In a second implementation form of the ONU according to the first aspect as such or any preceding implementation form of the first aspect, the receiver further configured to: receive the first PON frame at a first time; and receive the second PON frame at a second time, a time interval between the first time and the second time being a multiple of a PON cycle period.

In a third implementation form of the ONU according to the first aspect as such or any preceding implementation form of the first aspect, the first quantity is 128 bits.

In a fourth implementation form of the ONU according to the first aspect as such or any preceding implementation form of the first aspect, the first quantity is 192 bits.

In a fifth implementation form of the ONU according to the first aspect as such or any preceding implementation form of the first aspect, the matching requires a maximum number of (K) to be greater than 10.

In a sixth implementation form of the ONU according to the first aspect as such or any preceding implementation form of the first aspect, the matching requires K to be less than 30.

In a seventh implementation form of the ONU according to the first aspect as such or any preceding implementation form of the first aspect, the pre-stored sequence comprises a first sub-sequence and a second sub-sequence.

In an eighth implementation form of the ONU according to the first aspect as such or any preceding implementation form of the first aspect, the second sub-sequence is an inverted form of the first sub-sequence.

In a ninth implementation form of the ONU according to the first aspect as such or any preceding implementation form of the first aspect, the first PON frame is a downstream PON frame.

In a tenth implementation form of the ONU according to the first aspect as such or any preceding implementation form of the first aspect, the processor is further configured to perform clock recovery using the pre-stored sequence.

A second aspect relates to a method implemented by an ONU, the method comprising: receiving a first PON frame from an OLT, the first PON frame comprising a first PSBd, the first PSBd comprising a first PSync field, the first PSync field comprising first bits, and a first quantity of the first bits being greater than 64 bits; and performing synchronization of the first PON frame by matching the first bits to a pre-stored sequence.

In a first implementation form of the method according to the second aspect as such, the method further comprises: receiving a second PON frame, the second PON frame comprising a second PSBd field and the second PSBd field comprising a second PSync field, the second PSync field comprising second bits, a second quantity of the second bits being greater than 64 bits; and performing synchronization of the second PON frame by matching the second bits to the pre-stored sequence.

In a second implementation form of the method according to the second aspect as such or any preceding implementation form of the second aspect, the method further comprises: receiving the first PON frame at a first time; and receiving the second PON frame at a second time, a time interval between the first time and the second time being a multiple of a PON cycle period.

In a third implementation form of the method according to the second aspect as such or any preceding implementation form of the second aspect, the first quantity is 128 bits.

In a fourth implementation form of the method according to the second aspect as such or any preceding implementation form of the second aspect, the first quantity is 192 bits.

In a fifth implementation form of the method according to the second aspect as such or any preceding implementation form of the second aspect, the matching requires a maximum number of allowed error bits (K) to be greater than 10.

In a sixth implementation form of the method according to the second aspect as such or any preceding implementation form of the second aspect, the matching requires K to be less than 30.

In a seventh implementation form of the method according to the second aspect as such or any preceding implementation form of the second aspect, the pre-stored sequence comprises a first sub-sequence and a second sub-sequence.

In an eighth implementation form of the method according to the second aspect as such or any preceding implementation form of the second aspect, the second subsequence is an inverted form of the first sub-sequence.

In a ninth implementation form of the method according to the second aspect as such or any preceding implementation form of the second aspect, the first PON frame is a downstream PON frame.

In a tenth implementation form of the method according to the second aspect as such or any preceding implementation form of the second aspect, the processor is further configured to perform clock recovery using the pre-stored sequence.

A third aspect relates to an OLT, the OLT comprising: a processor configured to generate a PON frame comprising a PSBd field, the PSBd field comprising a PSync field, a SFC structure field, and a PON-ID structure field, the PSync field comprising first bits, a first quantity of the first bits being greater than 64 bits, the SFC structure field comprising a superframe counter field and a first HEC field, and the PON-ID structure field comprising a PON-ID field and a second HEC field; and a transmitter coupled to the processor and configured to transmit the PON frame to an ONU.

In a first implementation form of the OLT according to the third aspect as such, the SFC structure field is 8 bytes, the PON-ID structure field is 8 bytes, the superframe counter field is 51 bits, the first HEC field is 13 bits, the PON-ID field is 51 bits, and the second HEC field is 13 bits.

A fourth aspect relates to a method implemented by an OLT, the method comprising: generating a PON frame comprising a PSBd field, the PSBd field comprising a PSync field, a SFC structure field, and a PON-ID structure field, the PSync field comprising first bits, a first quantity of the first bits being greater than 64 bits, the SFC structure field comprising a superframe counter field and a first HEC field, and the PON-ID structure field comprising a PON-ID field and a second HEC field; and transmitting the PON frame to an ONU.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
BER: bit error rate
CO: central office
CPU: central processing unit
DS: downstream
DSP: digital signal processor
EO: electrical-to-optical
FPGA: field-programmable gate array
HEC: hybrid error control
LDPC: low-density parity-check
ODN: optical distribution network
OE: optical-to-electrical
OLT: optical line terminal
ONT: optical network terminal
ONU: optical network unit
PON: passive optical network
PON-ID: PON identifier
PSBd: DS physical synchronization block
PSBu: US physical synchronization block
PSync: physical synchronization sequence
P2MP: point-to-multipoint
RAM: random-access memory
RF: radio frequency
ROM: read-only memory
RX: receiver unit
SFC: superframe counter
SRAM: static RAM
TCAM: ternary content-addressable memory
TX: transmitter unit
US: upstream
VCXO: voltage-controlled crystal oscillator
XG-PON: 10-gigabit-capable PON
microsecond(s)
50G-PON: 50-gigabit-capable PON.

Figure 1:
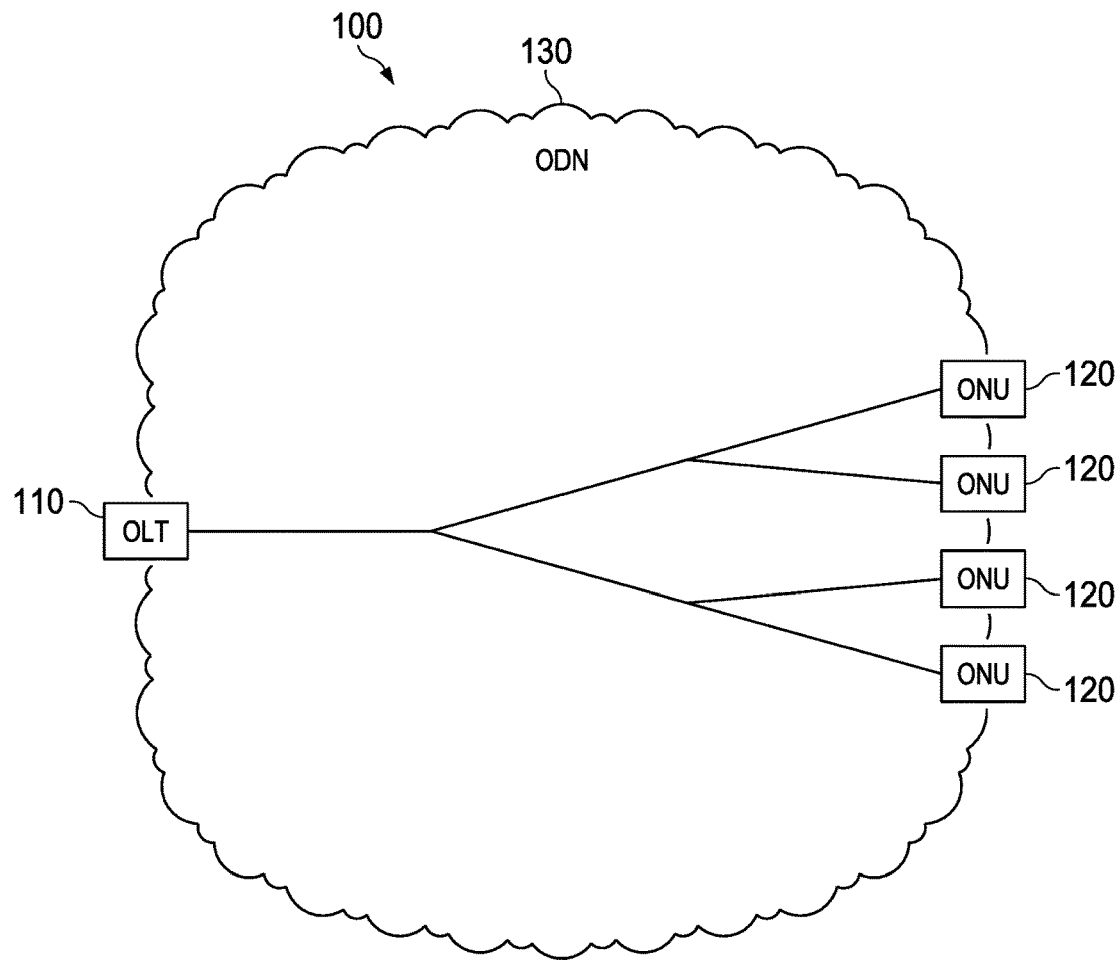
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. The ODN 130 extends from the OLT 110 to the ONUs 120 in a branching configuration as shown, but the ODN 130 may be configured in any other suitable P2MP configuration.

The ONUs 120 communicate with the OLT 110 and customers, and can act as intermediaries between the OLT 110 and the customers. For instance, the ONUs 120 forward data from the OLT 110 to the customers, and the ONUs 120 also forward data from the customers to the OLT 110. The ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

Figure 2:
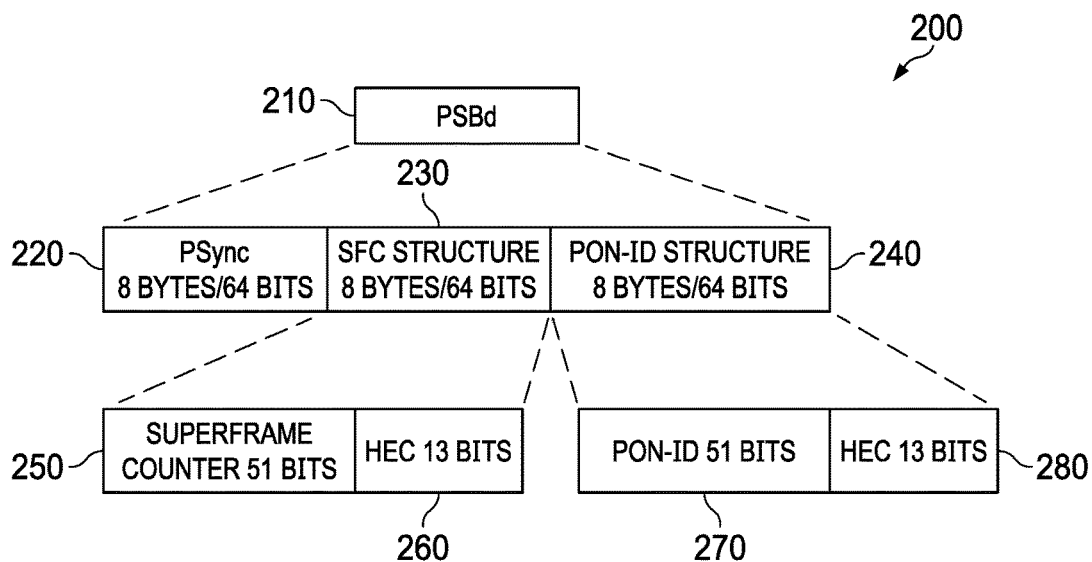
FIG. 2 is a schematic diagram of a typical PSBd in an XG-PON.

FIG. 2 is a schematic diagram of a typical PSBd 200 in an XG-PON. When the PON 100 implements an XG-PON, the OLT 110 transmits the PSBd 200 to the ONUs 120 to perform synchronization. The PSBd 200 comprises a PSBd field 210. The PSBd field 210 comprises a PSync field 220 of 8 bytes, an SFC structure field 230 of 8 bytes, and a PON-ID structure field 240 of 8 bytes. Thus, the PSBd field 210 has commonly been only 24 bytes in length. The PSync field 220 therefore comprises a fixed pattern of N=64 bits. The SFC structure field 230 comprises a superframe counter field 250 of 51 bits and an HEC field 260 of 13 bits. The PON-ID structure field 240 comprises a PON-ID field 270 of 51 bits and an HEC field 280 of 13 bits.

Figure 3:
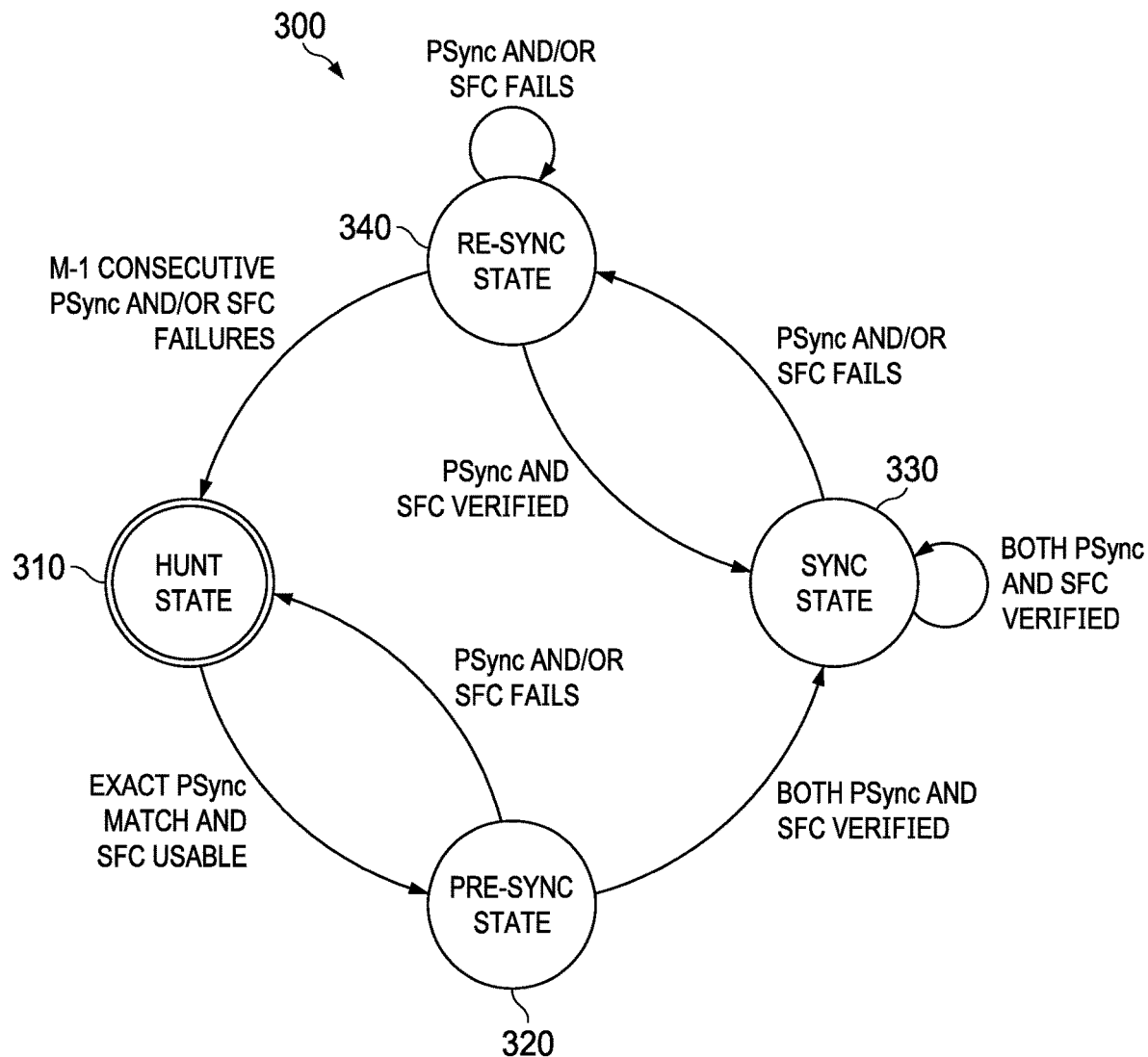
FIG. 3 is a DS ONU synchronization state machine.

FIG. 3 is a DS ONU synchronization state machine 300. The DS ONU synchronization state machine 300 comprises a hunt state 310, a pre-sync state 320, a sync state 330, and a re-sync state 340. An ONU 120 begins in the hunt state 310. From the hunt state 310, the ONU 120 proceeds to the pre-sync state 320, the sync state 330, or the re-sync state 340, or the ONU 120 proceeds back to the hunt state 310. The ONU 120 does so based on matching of the PSync field 220 in the PSBd 200 to a pre-stored sequence and based on verification of the SFC structure field 230 in the PSBd 200. M is a counter indicating a maximum number of consecutive PSync field 220 match failures and SFC structure field 230 verification failures. In an XG-PON, M=3. An initial synchronization stage corresponds to the hunt state 310, the pre-sync state 320, and the sync state 330. A tracking stage corresponds to the sync state 330 and the re-sync state 340.

Currently, the PON 100 may implement an XG-PON using the PSBd 200 and the DS ONU synchronization state machine 300. As mentioned above, typical values of N=64 and M=3 can be used for an XG-PON. In addition, the ONUs 120 determine a PSync field 220 match failure based on K, a maximum number of allowed error bits in PSync field 220 matching, and based on Pe, a BER reference level. In an XG-PON, typical values of K=2 and $Pe=1e^{-3}$ can be used. With N=64, M=3, K=2, and $Pe=1e^{-3}$, the probability of the ONUs 120 missing a synchronization or having a false synchronization is greater than $5e^{-14}$. That probability corresponds to an average of about 80 years between ONU 120 synchronization failures, which is an acceptable time.

In the future, the PON 100 may implement a 50G-PON using a new PSBd and the downstream ONU synchronization state machine 300. The 50G-PON will use advanced signal processing such as LDPC, which will allow the ONUs 120 to operate at a higher BER reference level of $Pe=2e^{-2}$. However, if values of N=64, M=3, K=2 were employed as in an XG-PON, along with the $Pe=2e^{-2}$, then the probability of the ONUs 120 missing a synchronization or having a false synchronization in the 50G-PON is greater than $2e^{-11}$. That probability corresponds to an average of about 0.2 years between synchronization failures, which is not an acceptable time. There is therefore a desire for a PSync field that provides more reliable synchronization.

Disclosed herein are embodiments for PON synchronization and clock recovery. The embodiments comprise a PSync field that provides more reliable synchronization. The PSync field in embodiments disclosed herein allows for a variably-sized field, with N values greater than N=64 bits. The PSync field in embodiments disclosed herein has a larger length N. For instance, in example embodiments, values of N=128 bits or N=192 bits can be employed. Because N is larger in the embodiments herein, then the ONUs may determine PSync field match failures based on a higher value of K. In one example, the PSync field according to any of the embodiments herein results in greatly reduced synchronization failures, such as synchronization failures occurring at intervals of only about 39.5 years to 17,400 years. In addition, the PSync field according to any of the embodiments herein may implement inverted and repeating sequences to maintain computational capacity and thus conserve power. Finally, the ONUs may use the PSync field to perform clock recovery.

Figure 4:
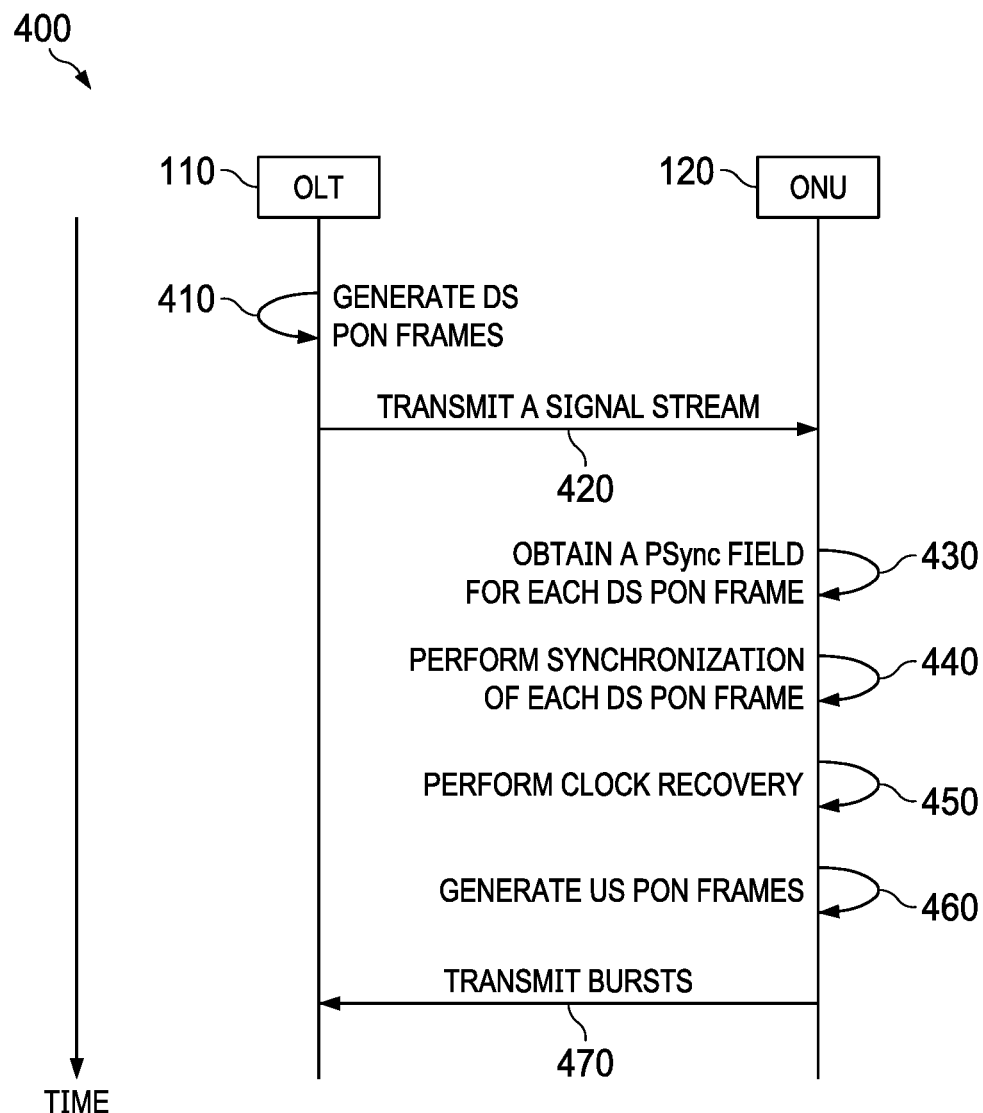
FIG. 4 is a message sequence diagram of PON communication.

FIG. 4 is a message sequence diagram 400 of PON communication. At step 410, the OLT 110 generates a DS PON frame or frames. FIGS. 5-10 further describe FIG. 4, so descriptions of FIGS. 5-10 are included within the description of FIG. 4 below.

Figure 5:
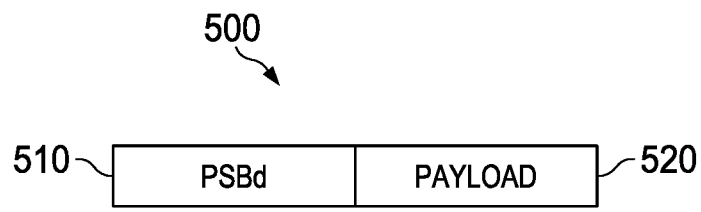
FIG. 5 is a schematic diagram of a PON frame.

FIG. 5 is a schematic diagram of a PON frame 500. The PON frame 500 may implement the DS PON frames, such as in step 410 of FIG. 4. The PON frame 500 comprises a PSBd 510 and a payload 520. The PSBd 510 facilitates synchronization in the ONUs 120 as described below. The payload 520 comprises data intended for users of the ONUs 120. The PON frame 500 is typically about 125 μs long, which corresponds to a PON cycle time.

Figure 6:
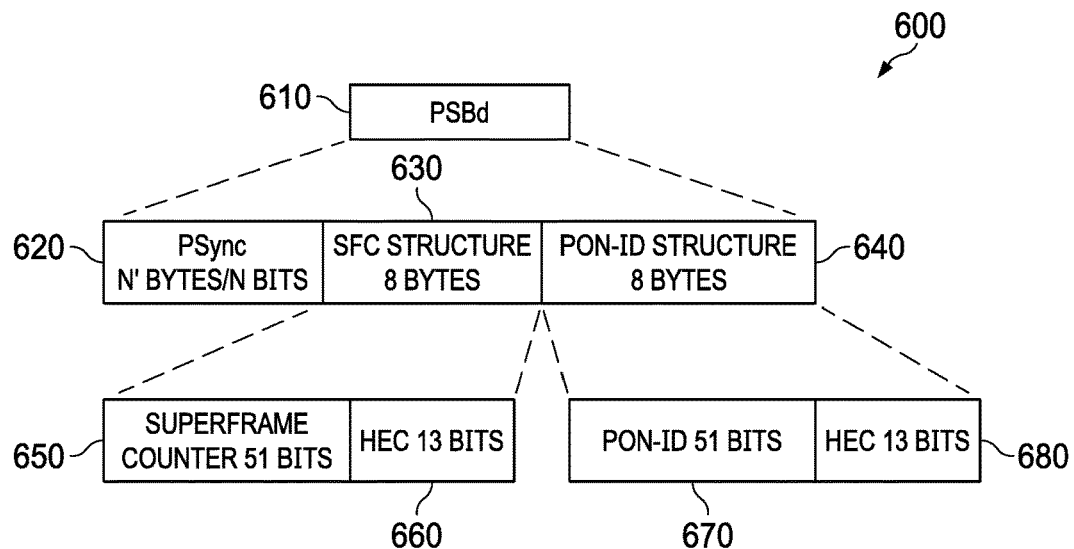
FIG. 6 is a schematic diagram of a PSBd in a 50G-PON according to an embodiment of the disclosure.

FIG. 6 is a schematic diagram of a PSBd 600 in a 50G-PON according to an embodiment of the disclosure. The PSBd 600 may implement the PSBd 510 in FIG. 5. The PSBd 600 is similar to the PSBd 200 in FIG. 2. Specifically, the PSBd 600 comprises a PSBd field 610 similar to the PSBd field 210. The PSBd field 610 comprises a PSync field 620, an SFC structure field 630, and a PON-ID structure field 640 similar to the PSync field 220, the SFC structure field 230, and the PON-ID structure field 240, respectively. The SFC structure field 630 comprises a superframe counter field 650 and an HEC field 660 similar to the superframe counter field 250 and the HEC field 260, respectively. The PON-ID structure field 640 comprises a PON-ID field 670 and an HEC field 680 similar to the PON-ID field 270 and the HEC field 280, respectively. However, unlike the PSync field 220 in FIG. 2, which has a fixed and predefined length N=64 bits (8 bytes), in the embodiment of FIG. 6 the PSync field 620 has an increased length N'. As a result, the PSBd field 610 has an increased PSBd field 610 length X, allowing the PSync field length N to also be increased. Consequently, the PSBd field 610 length X according to the disclosed embodiments comprises an integer greater than 24, such as X=(24+8) bytes=32 bytes (or 256 bits), or X=(24+16) bytes=40 bytes (or 320 bits). In some embodiments, the PSync field 620 comprises a length N' of N'=16 bytes (128 bits). When the PSync field 620 comprises a length N' of N'=16 bytes, then the PSBd field 610 length X=16+16=32 bytes. In other embodiments, the PSync field 620 comprises a length N' of N'=24 bytes (192 bits). When the PSync field 620 comprises a length N' of N'=24 bytes, then the PSBd field 610 length X=24+16=40 bytes. It should be understood that other or additional PSync field lengths can be employed.

To increase the time between ONU synchronization failures in a 50G-PON, at least two changes may be made. First, the OLT 110 increases the PSync field 620 length N', which is enabled by increasing the PSBd field 610 length X For instance, N'=9, 10, . . . , 30 bytes. The SFC structure field 630 and the PON-ID structure field 640 together occupy a fixed 16 bytes (or 128 bits). Therefore, if N'>8 bytes (i.e. N'=16 or 24 bytes), then the PSBd field 610 length X will be greater than 24 bytes. For instance, the PSBd field 610 length X can comprise X=25, 26, . . . , 46 bytes. In a first embodiment, the PSBd field 610 length X comprises X=32 bytes where the PSync field 620 length N' comprises N'=16 bytes (128 bits). In a second embodiment, the PSBd field 610 length X comprises X=40 bytes where the PSync field 620 length N' comprises N'=24 bytes (192 bits).

Second, the ONUs 120 increase the value of K. Specifically, K>2. For instance, K =3, 4, . . . , 30. In a first embodiment, 10<K<30. In a second embodiment, 15<K<25. In a third embodiment, K is determined based on its approximate value where a first curve corresponding to a probability of a missed synchronization intersects with a second curve corresponding to a probability of a false synchronization such that the probability of the missed synchronization is about the same as the probability of the false synchronization. In a fourth embodiment, K is determined based on its approximate value where a third curve corresponding to a number of years between missed synchronizations intersects with a fourth curve corresponding to a number of years between false synchronizations such that the number of years between missed synchronizations is about the same as the number of years between false synchronizations. In this context, the approximate value of K may be its value rounded down or rounded up to the nearest whole number. When the PSync field 620 length N'=16 bytes (128 bits), and assuming M=3 and $Pe=5e^{-2}$, that intersection occurs when K=22 during the initial synchronization stage and when K=19 during the tracking stage. The higher K values are possible because of the higher PSBd length X values, and thus higher PSync field 620 length values N', allowing for the ONUs 120 to receive more bits of the PSync field 620 in error.

In an example, N=16 bytes (128 bits), K=22 in the initial synchronization stage, and K=19 in the tracking stage. Even assuming a relatively high $Pe=5e^{-2}$, the PSync field 620 provides for an acceptable time between ONU 120 synchronization failures. Specifically, the ONUs 120 would have missed synchronizations an average of every 417 years in the initial synchronization stage and an average of every 17,400 years in the tracking stage. In addition, the ONUs 120 would have false synchronizations an average of every 39.5 years in the initial synchronization stage and an average of every 3,430 years in the tracking stage. Thus, the PSync field 620 according to any of the embodiments herein provides for more reliable synchronization.

Figure 7A:
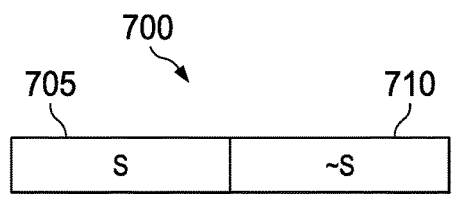
FIG. 7A is a schematic diagram of a PSync field according to a first embodiment of the disclosure.

FIGS. 7A-7D are schematic diagrams of PSync fields that may implement the PSync field 620 of FIG. 6. FIG. 7A is a schematic diagram of a PSync field 700 according to a first embodiment of the disclosure. The PSync field 700 comprises a first sub-sequence 705 and a second sub-sequence 710. The first sub-sequence 705 comprises a sequence S, and the second sub-sequence 710 comprises an inverted sequence S, denoted as ~S. For instance, if S is a binary sequence 101, then ~S is a binary sequence 010.

Figure 7B:
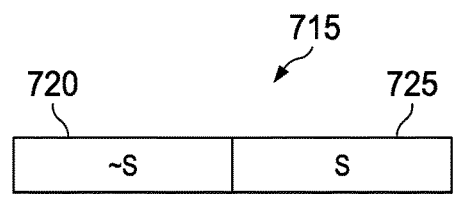
FIG. 7B is a schematic diagram of a PSync field according to a second embodiment of the disclosure.

FIG. 7B is a schematic diagram of a PSync field 715 according to a second embodiment of the disclosure. The PSync field 715 comprises a first sub-sequence 720 and a second sub-sequence 725. The first sub-sequence 720 comprises ~S, and the second sub-sequence 725 comprises S.

Figure 7C:
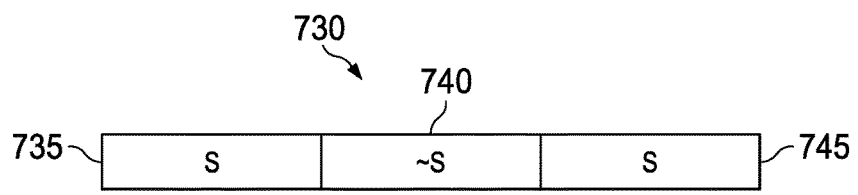
FIG. 7C is a schematic diagram of a P Sync field according to a third embodiment of the disclosure.

FIG. 7C is a schematic diagram of a PSync field 730 according to a third embodiment of the disclosure. The PSync field 730 comprises a first sub-sequence 735, a second sub-sequence 740, and a third sub-sequence 745. The first sub-sequence 735 comprises S, the second sub-sequence 740 comprises ~S, and the third sub-sequence 745 comprises S.

Figure 7D:
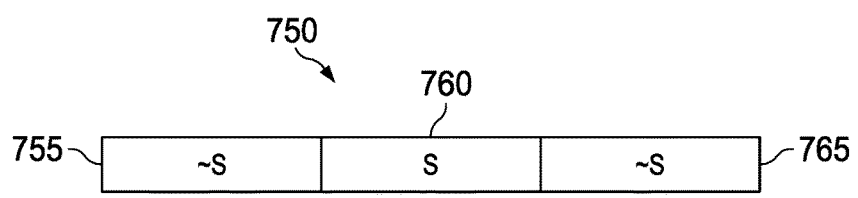
FIG. 7D is a schematic diagram of a P Sync field according to a fourth embodiment of the disclosure.

FIG. 7D is a schematic diagram of a PSync field 750 according to a fourth embodiment of the disclosure. The PSync field 750 comprises a first sub-sequence 755, a second sub-sequence 760, and a third sub-sequence 765. The first sub-sequence 755 comprises ~S, the second sub-sequence 760 comprises S, and the third sub-sequence 765 comprises ~S.

S may be a Gold sequence or an m-sequence, which are known in the art. By using S and ~S, and by repeating the S or the ~S in various patterns, the ONUs 120 may need to implement only a correlator of S or only a correlator of ~S instead of a correlator for both S and ~S. Thus, the OLT 110 may increase the PSBd length X and therefore also increase the length N' of the PSync field 620 without the ONUs 120 needing to increase their computational capacity. Maintaining the same amount of computational capacity conserves power. In an embodiment, S is 64 bits long, so the PSync fields 700, 715 are N'=64 X 2=16 bytes (128 bits) and the PSync fields 730, 750 are N'=64 X 3=24 bytes (192 bits).

In a first alternative, the PSync field 620 has more than three fields. In a second alternative, all of the fields in the PSync field 620 are the same. For instance, a first field and a second field are both S, or the first field and the second field are both ~S.

Returning to FIG. 4, at step 420, the OLT 110 transmits a signal stream. The signal stream comprises the DS PON frames from step 410. At step 430, an ONU 120 obtains a PSync field for each DS PON frame. The PSync fields may be the PSync field 620.

At step 440, the ONU 120 performs synchronization of each DS PON frame. The ONU 120 does so by implementing the DS ONU synchronization state machine 300 and using the PSync field 620 from each DS PON frame.

Specifically, the ONU 120 matches bits of the PSync field 620 to a pre-stored sequence. The ONU 120 stores the pre-stored sequence at least before the ONU 120 receives the PON frame 500. The pre-stored sequence is the same as the PSync field 620 when originally transmitted by the OLT 110. For instance, when the PSync field 620 is the PSync field 730 or 750, the ONU 120 performs the matching by performing a 3-tap L-Bit spaced sum, where L is a positive integer.

Figure 8:
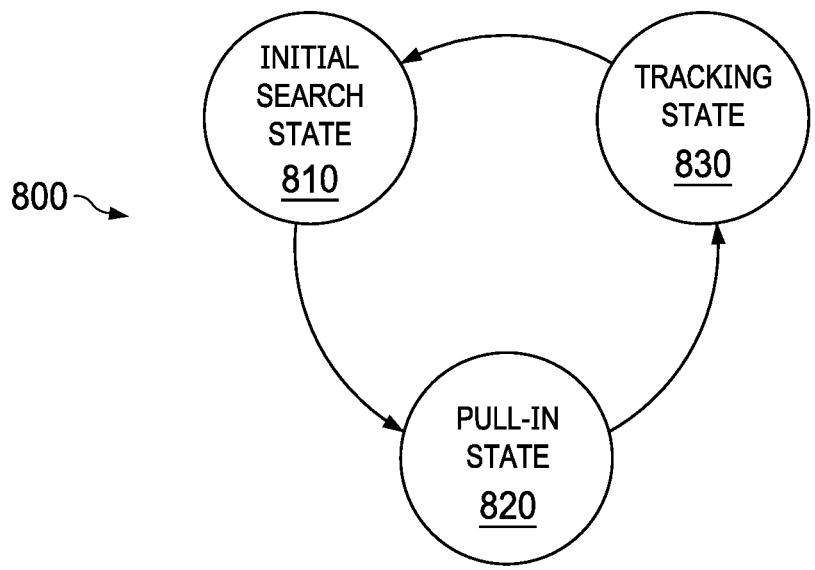
FIG. 8 is a clock recovery state machine according to an embodiment of the disclosure.

At step 450, the ONU 120 performs clock recovery. The clock recovery aligns the clock of the ONU 120 with the clock of the OLT 110. The ONU 120 performs clock recovery as shown or at another suitable time. For instance, the ONU 120 performs clock recovery when the ONU 120 joins the PON 100. FIG. 8 further describes step 450.

FIG. 8 is a clock recovery state machine 800 according to an embodiment of the disclosure. The clock recovery state machine 800 may implement step 450 in FIG. 4. The clock recovery state machine 800 comprises an initial search state 810, a pull-in state 820, and a tracking state 830. The ONU 120 begins in the initial search state 810.

In the initial search state 810, the ONU 120 implements an algorithm to detect a first synchronization correlation peak. The synchronization correlation peak occurs when the PSync field 620 matches a pre-stored sequence. The algorithm is described below. The ONU 120 uses a relatively high threshold to reduce the likelihood of a false detection. For example, the threshold level may be set as twice a mean level of correlator outputs. When the ONU 120 detects the first synchronization correlation peak, the ONU 120 moves to the pull-in state 820.

In the pull-in state 820, the ONU 120 implements the algorithm to detect a second synchronization correlation peak in a search window next to the first synchronization correlation peak. A maximum pull-in range determines the size of the search window. The ONU 120 estimates a clock frequency offset from the first synchronization correlation peak and the second synchronization correlation peak. The ONU 120 uses the clock frequency offset to adjust a VCXO. When the VCXO settles, the ONU 120 moves to the tracking state 830.

In the tracking state 830, the ONU 120 narrows the search window to reduce a false detection. For example, the ONU 120 may narrow the search window to be about twice the PSync period.

Figure 9:
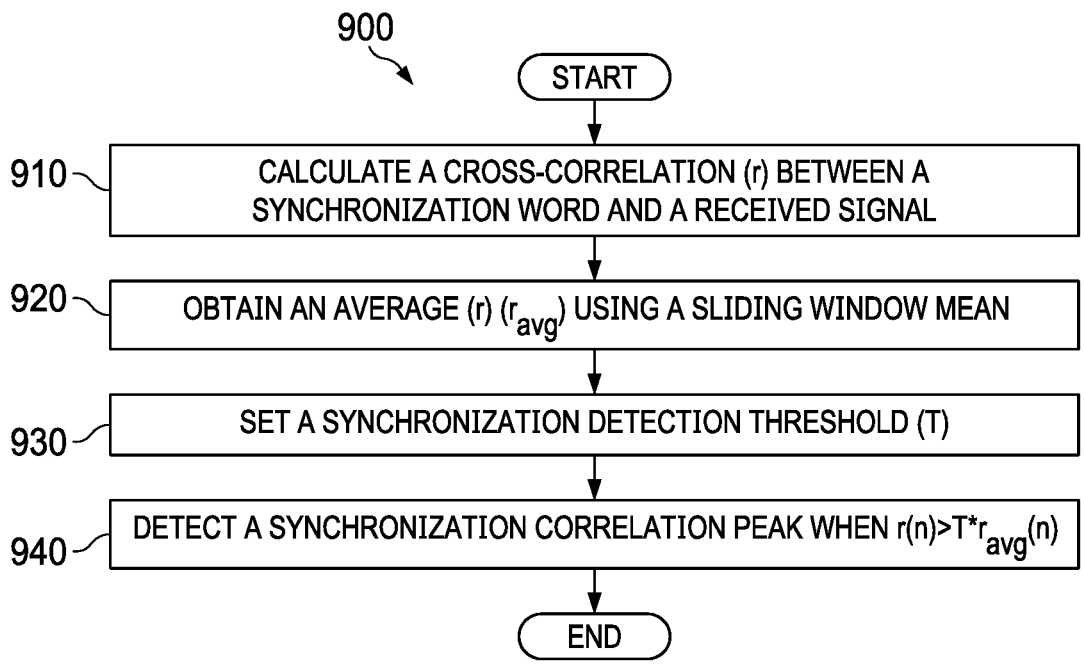
FIG. 9 is a flowchart illustrating a method of synchronization word detection according to an embodiment of the disclosure.

FIG. 9 is a flowchart illustrating a method 900 of synchronization word detection according to an embodiment of the disclosure. The method 900 may implement the algorithm in the clock recovery state machine 800. At step 910, a cross-correlation (r) between a synchronization word and a received signal is calculated, where r is an N-point cross-correlation. The synchronization word is an N-point sequence, for instance a Gold sequence, with suitable auto-correlation properties that produce a relatively high synchronization peak. At step 920, $r_{avg}$ is obtained using a sliding window mean operation. The sliding window is a 128-point sliding window or a 256-point sliding window, for example. At step 930, a synchronization detection threshold (T) is set. Finally, at step 940, a synchronization correlation peak is detected when $r(n) > T*r_{avg}(n)$, where n is an index of received waveform samples.

Figure 10:
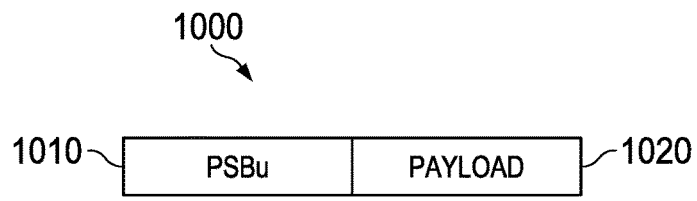
FIG. 10 is a schematic diagram of a US PON frame according to an embodiment of the disclosure.

Returning to FIG. 4, at step 460, the ONU 120 generates US PON frames. FIG. 10 further illustrates step 460.

FIG. 10 is a schematic diagram of a US PON frame 1000 according to an embodiment of the disclosure. The US PON frame 1000 may implement the US PON frames generated in step 460 in FIG. 4. The US PON frame 1000 in this example embodiment comprises a PSBu 1010 and a payload 1020. The US PSBu 1010 may be similar to the DS PSBd 510 in FIG. 5. The US PSBu 1010 facilitates synchronization in the OLT 110. The payload 1020 comprises data from users of the ONUs 120. The US PON frame 1000 is 125 μs long.

Returning to FIG. 4, at step 470 the ONU 120 transmits bursts to the OLT 110. The bursts comprise the US PON frames from step 460.

Figure 11:
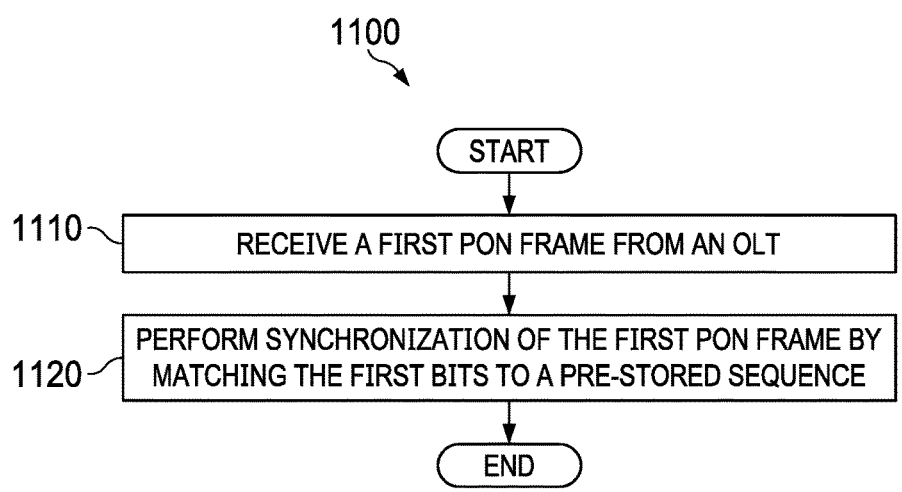
FIG. 11 is a flowchart illustrating a method of synchronization according to an embodiment of the disclosure.

FIG. 11 is a flowchart illustrating a method 1100 of synchronization according to an embodiment of the disclosure. At step 1110, a first PON frame is received in an ONU from an OLT. The first PON frame comprises a first PSBd. The first PSBd comprises a first PSync field, the first PSync field comprises first bits, and a first quantity of the first bits is greater than 64 bits. The first PON frame may be a DS PON frame transmitted from the OLT 110 to the ONU 120. For instance, an ONU 120 receives the PON frame 500 comprising the PSync field 620 as described above. At step 1120, synchronization of the first PON frame is performed by matching the first bits to a pre-stored sequence. For instance, the ONU 120 performs synchronization as described for step 440 in FIG. 4.

A second DS PON frame may be received. The second DS PON frame may comprise a second PSBd, the second PSBd may comprise a second PSync field, the second PSync field may comprise second bits, and a second quantity of the second bits may be greater than 64 bits. Synchronization of the second PON frame may be performed by matching the second bits to the pre-stored sequence. The first PON frame and the second PON frame may form part of a signal stream. The first PON frame may be further received at a first time. The second PON frame may be further received at a second time. A time interval between the first time and the second time may be a multiple of a PON cycle period. The PON cycle period may be 125 μs.

The first quantity may be 128 bits. Alternatively, the first quantity may be 192 bits. However, other PSync field lengths N' are contemplated and are within the scope of the description and claims. The matching may require K to be greater than 10. The matching may require K to be less than 30. The matching may require K to be its approximate value where a probability of a missed synchronization is about the same as a probability of a false synchronization.

The matching may comprise cross-correlation. The cross-correlation may be based on a T-spaced waveform, where T is a modulation symbol period. The cross-correlation may be based on a T/2-spaced waveform.

The pre-stored sequence may be a Gold sequence. The pre-stored sequence may be an m-sequence. The pre-stored sequence may comprise a first sub-sequence and a second sub-sequence. The second sub-sequence may be an inverted form of the first sub-sequence.

Clock recovery may be performed using the pre-stored sequence. The clock recovery may comprise an initial search state. The clock recovery may further comprise a pull-in state. The clock recovery may further comprise a tracking state.

Figure 12:
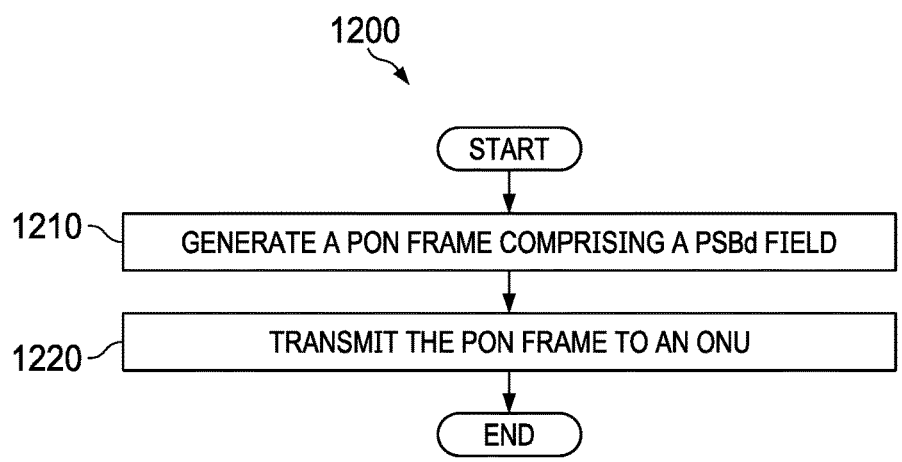
FIG. 12 is a flowchart illustrating a method of synchronization according to another embodiment of the disclosure.

FIG. 12 is a flowchart illustrating a method 1200 of synchronization according to another embodiment of the disclosure. At step 1210, a DS PON frame comprising a PSBd field is generated. The PSBd field comprises a PSync field, an SFC structure field, and a PON-ID structure field. The PSync field comprises first bits. A quantity of the first bits is greater than 64 bits. The SFC structure field comprises a superframe counter field and a first HEC field. The PON-ID structure field comprises a PON-ID field and a second HEC field. For instance, the OLT 110 generates the PON frame 500 as described for step 410 in FIG. 4. At step 1220, the DS PON frame is transmitted to an ONU. For instance, the OLT 110 transmits the PON frame to the ONU 120 as described for step 420 in FIG. 4.

The SFC structure field may be 8 bytes. The PON-ID structure field may be 8 bytes. The superframe counter field may be 51 bits. The first HEC field may be 13 bits. The PON-ID field may be 51 bits. The second HEC field may be 13 bits.

Figure 13:
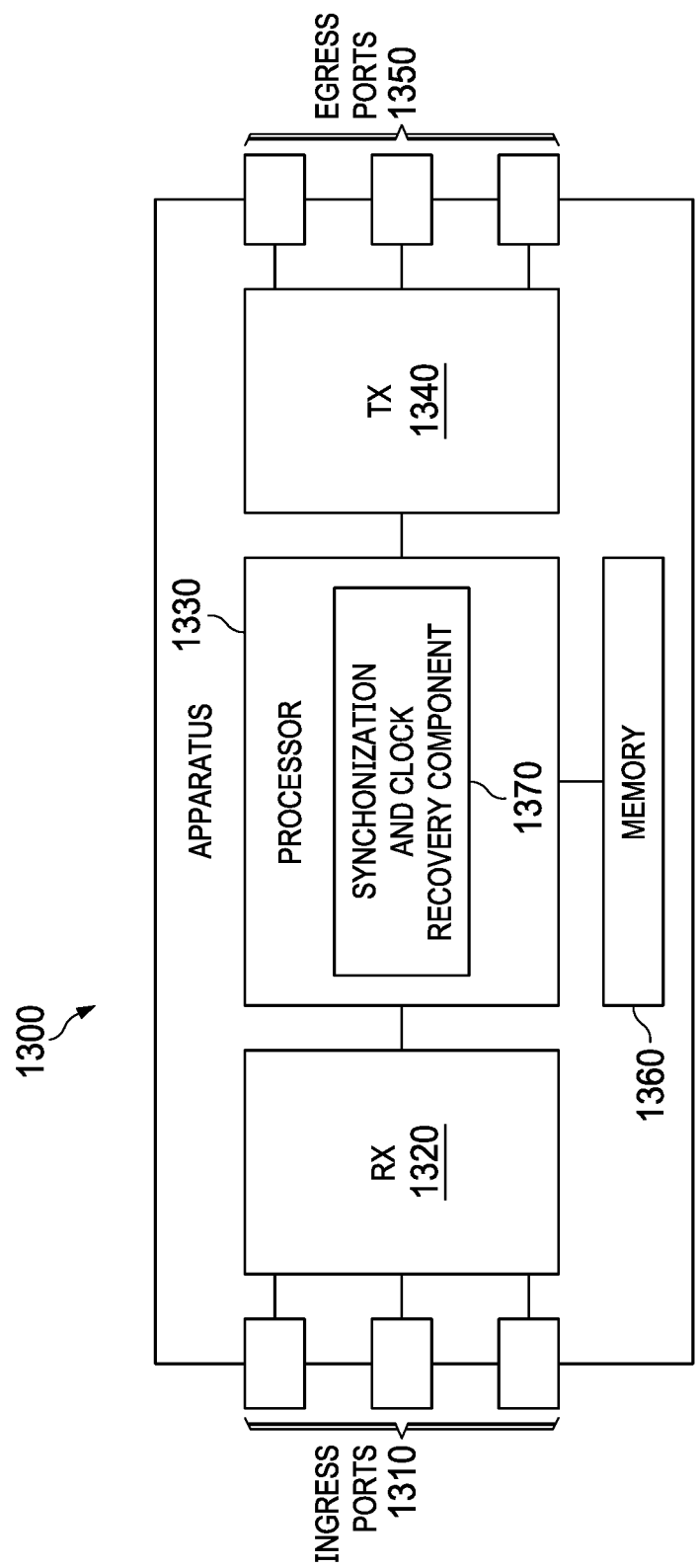
FIG. 13 is a schematic diagram of an apparatus according to an embodiment of the disclosure.

FIG. 13 is a schematic diagram of an apparatus 1300 according to an embodiment of the disclosure. The apparatus 1300 may implement the disclosed embodiments. The apparatus 1300 comprises ingress ports 1310 and an RX 1320 or receiving means to receive data; a processor, 1330 or logic unit, baseband unit, CPU, or processing means to process the data; a TX 1340 or transmitting means and egress ports 1350 to transmit the data; and a memory 1360 or data storage means to store the data. The apparatus 1300 may also comprise OE components, EO components, or RF components coupled to the ingress ports 1310, the RX 1320, the TX 1340, and the egress ports 1350 to provide ingress or egress of optical signals, electrical signals, or RF signals.

The processor 1330 is any combination of hardware, middleware, firmware, or software. The processor 1330 comprises any combination of one or more CPU chips, cores, FPGAs, ASICs, or DSPs. The processor 1330 communicates with the ingress ports 1310, the RX 1320, the TX 1340, the egress ports 1350, and the memory 1360. In some embodiments, the processor 1330 includes a synchronization and clock recovery component 1370, wherein the synchronization and clock recovery component 1370 comprises instructions that implement the disclosed embodiments when executed by the processor 1330. The inclusion of the synchronization and clock recovery component 1370 therefore provides a substantial improvement to the functionality of the apparatus 1300 and effects a transformation of the apparatus 1300 to a different state. Alternatively, the memory 1360 stores the synchronization and clock recovery component 1370 as instructions, and the processor 1330 executes those instructions.

The memory 1360 comprises any combination of disks, tape drives, or solid-state drives. The memory 1360 may store instructions for execution by the processor 1330. The memory 1360 may store data and/or working or intermediate values. The memory 1360 may store processing results. The apparatus 1300 may use the memory 1360 as an over-flow data storage device to store programs when the apparatus 1300 selects those programs for execution and to store instructions and data that the apparatus 1300 reads during execution of those programs, for instance as a computer program product. The memory 1360 may store additional or other data not mentioned herein. The memory 1360 may be volatile or non-volatile and may be any combination of ROM, RAM, TCAM, or SRAM.

A computer program product may comprise computer-executable instructions stored on a non-transitory medium, for instance the memory 1360, that when executed by a processor, for instance the processor 1330, cause an apparatus to perform any of the embodiments.

An ONU is in a PON. The ONU comprises a receiving means and a processing means. The receiving means is configured to receive a first PON frame from an OLT. The first PON frame comprises a first PSBd field. The first PSBd field comprises a first PSync field. The first PSync field comprises first bits. A first quantity of the first bits is greater than 64. The processing means is coupled to the receiving means and is configured to perform synchronization of the first PON frame by matching the first bits to a pre-stored sequence.

The terms "about," "approximately," and their derivatives mean within ±10% of a subsequent modifier. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical network unit (ONU) comprising:
    a receiver configured to receive a first passive optical network (PON) frame from an optical line terminal (OLT), the first PON frame comprising a first downstream physical synchronization block (PSBd) field, the first PSBd field comprising a first physical synchronization sequence (PSync) field, the first PSync field comprising first bits, and a first quantity of the first bits being greater than 64 bits; and
    a processor coupled to the receiver and configured to perform synchronization of the first PON frame by matching the first bits to a pre-stored sequence,
    the matching requires a maximum number of allowed error bits (K) to be greater than 10.

2. The ONU of claim 1, wherein the receiver is further configured to receive a second PON frame, the second PON frame comprises a second PSBd field, the second PSBd field comprises a second PSync field, the second PSync field comprises second bits, a second quantity of the second bits is greater than 64 bits, and the processor is further configured to perform synchronization of the second PON frame by matching the second bits to the pre-stored sequence.

3. The ONU of claim 2, wherein the receiver is further configured to:
    receive the first PON frame at a first time; and
    receive the second PON frame at a second time, a time interval between the first time and the second time being a multiple of a PON cycle period.

4. The ONU of claim 1, wherein the first quantity is 128 bits or 192 bits.

5. The ONU of claim 1, wherein the matching requires K to be less than 30.

6. The ONU of claim 1, wherein the pre-stored sequence comprises a first sub-sequence and a second sub-sequence, and wherein the second sub-sequence is an inverted form of the first sub-sequence.

7. The ONU of claim 1, wherein the first PON frame is a downstream PON frame.

8. The ONU of claim 1, wherein the processor is further configured to perform clock recovery using the pre-stored sequence.

9. A method implemented by an optical network unit (ONU) and comprising:
receiving a first passive optical network (PON) frame from an optical line terminal (OLT), the first PON frame comprising a first downstream physical synchronization block (PSBd) field, the first PSBd field comprising a first physical synchronization sequence (PSync) field, the first PSync field comprising first bits, and a first quantity of the first bits being greater than 64 bits;
performing synchronization of the first PON frame by matching the first bits to a pre-stored sequence; and
performing clock recovery using the pre-stored sequence.

10. The method of claim 9, the method further comprising:
receiving a second PON frame, the second PON frame comprising a second PSBd field, the second PSBd field comprising a second PSync field, the second PSync field comprising second bits, and a second quantity of the second bits being greater than 64 bits; and
performing synchronization of the second PON frame by matching the second bits to the pre-stored sequence.

11. The method of claim 10, further comprising:
receiving the first PON frame at a first time; and
receiving the second PON frame at a second time, a time interval between the first time and the second time being a multiple of a PON cycle period.

12. The method of claim 9, wherein the first quantity is 128 bits or 192 bits.

13. The method of claim 9, wherein the matching requires a maximum number of allowed error bits (K) to be greater than 10.

14. The method of claim 13, wherein the matching requires K to be less than 30.

15. The method of claim 9, wherein the pre-stored sequence comprises a first sub-sequence and a second sub-sequence, and wherein the second sub-sequence is an inverted form of the first sub-sequence.

16. An optical network unit (ONU) comprising:
a receiver configured to receive a first passive optical network (PON) frame from an optical line terminal (OLT), the first PON frame comprising a first downstream physical synchronization block (PSBd) field, the first PSBd field comprising a first physical synchronization sequence (PSync) field, the first PSync field comprising first bits, and a first quantity of the first bits being greater than 64 bits; and
a processor coupled to the receiver and configured to:
perform synchronization of the first PON frame by matching the first bits to a pre-stored sequence; and
performing clock recovery using the pre-stored sequence.

17. The ONU of claim 16, wherein the receiver is further configured to receive a second PON frame, wherein the second PON frame comprises a second PSBd field, wherein the second PSBd field comprises a second PSync field, wherein the second PSync field comprises second bits, wherein a second quantity of the second bits is greater than 64 bits, and wherein the processor is further configured to perform synchronization of the second PON frame by matching the second bits to the pre-stored sequence.

18. The ONU of claim 17, wherein the receiver is further configured to:
receive the first PON frame at a first time; and
receive the second PON frame at a second time, a time interval between the first time and the second time being a multiple of a PON cycle period.

19. A method implemented by an optical network unit (ONU), the method comprising:
receiving a first passive optical network (PON) frame from an optical line terminal (OLT), the first PON frame comprising a first downstream physical synchronization block (PSBd) field, the first PSBd field comprising a first physical synchronization sequence (PSync) field, the first PSync field comprising first bits, and a first quantity of the first bits being greater than 64 bits; and
performing synchronization of the first PON frame by matching the first bits to a pre-stored sequence,
wherein the matching requires a maximum number of allowed error bits (K) to be greater than 10.

20. The method of claim 19, wherein the matching requires K to be less than 30.

* * * * *